(12) United States Patent
Wenzel et al.

(10) Patent No.: US 9,360,137 B2
(45) Date of Patent: Jun. 7, 2016

(54) GARDEN HOSE AND HOSE IRRIGATION SYSTEM COMPRISING SAID GARDEN HOSE

(71) Applicant: Husqvarna AB, Huskvarna (SE)

(72) Inventors: Edmond Wenzel, Schwendi (DE); Sonja Kreutle, Ehingen (DE); Aleksandar Tatic, Ulm (DE); Timo Grossman, Kirchberg-Sinningen (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/359,642

(22) PCT Filed: Nov. 21, 2012

(86) PCT No.: PCT/EP2012/073255
§ 371 (c)(1),
(2) Date: May 21, 2014

(87) PCT Pub. No.: WO2013/076153
PCT Pub. Date: May 30, 2013

(65) Prior Publication Data
US 2014/0338774 A1 Nov. 20, 2014

(30) Foreign Application Priority Data
Nov. 21, 2011 (DE) .......................... 10 2011 055 570

(51) Int. Cl.
*F16L 11/00* (2006.01)
*F16L 11/12* (2006.01)
(Continued)

(52) U.S. Cl.
CPC . *F16L 11/00* (2013.01); *B32B 1/08* (2013.01); *F16L 11/12* (2013.01); *F16L 11/121* (2013.01); *F16L 21/00* (2013.01); *F16L 33/224* (2013.01); *B32B 2597/00* (2013.01)

(58) Field of Classification Search
CPC ..... F16L 11/083; F16L 11/115; F16L 11/121; F16L 11/124
USPC ................... 138/109, 104, 121, 125
See application file for complete search history.

(56) References Cited

U.S. PATENT DOCUMENTS 2,731,279 A * 1/1956 Main, Jr. .......................... 285/95
3,042,737 A * 7/1962 Brumbach et al. .............. 174/47
(Continued)

FOREIGN PATENT DOCUMENTS

| CN | 201706086 U | 1/2011 |
| CN | 201875302 U | 6/2011 |

(Continued)

OTHER PUBLICATIONS

International Search Report and Written Opinion of PCT/EP2012/073255 mailed Jan. 18, 2013.
(Continued)

*Primary Examiner* — James Hook
(74) *Attorney, Agent, or Firm* — Nelson Mullins Riley & Scarborough LLP

(57) ABSTRACT

The invention relates to a garden hose with at least one cover layer. The aim of the invention is to improve the grip of the hose relative to the hand of the user and/or on a connection to a connecting element via a compression-type fitting. For this purpose, a relief structure is produced on an outward surface of a cover layer of the hose. The relief structure can substantially improve the haptic impression and/or, when the connection is tight, bring about an interlocking or at least semi-interlocking engagement of retaining elements of a connecting element with the relief structure and substantially increase the retaining force which prevents the hose end from accidentally slipping off the connecting element.

20 Claims, 3 Drawing Sheets

Figure 1:
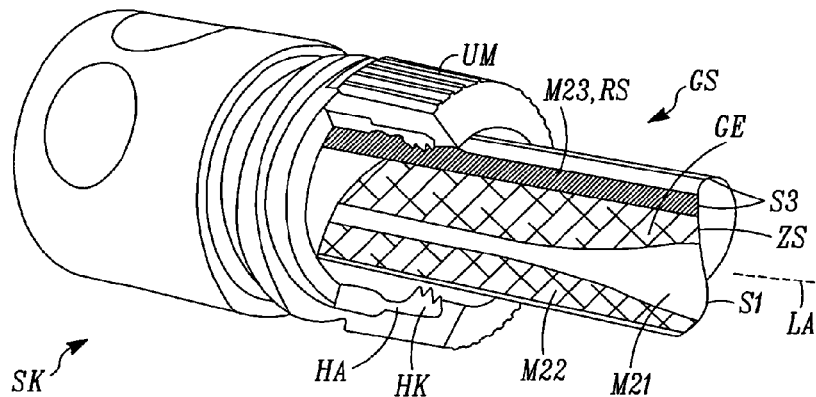

(51) Int. Cl.
*F16L 21/00* (2006.01)
*B32B 1/08* (2006.01)
*F16L 33/22* (2006.01)

(56) References Cited

U.S. PATENT DOCUMENTS

| | | | |
|---|---|---|---|
| 3,367,370 A * | 2/1968 | Sherlock | 138/104 |
| 3,383,258 A * | 5/1968 | Houlston | 156/86 |
| 3,551,542 A * | 12/1970 | Perrone | B29C 47/0016 174/112 |
| 3,825,036 A | 7/1974 | Stent | |
| 4,275,768 A * | 6/1981 | Riggs et al. | 138/104 |
| 4,366,841 A * | 1/1983 | Currie et al. | 138/109 |
| 4,399,852 A * | 8/1983 | Hausch | 152/96 |
| 4,867,485 A | 9/1989 | Seckel | |
| 5,027,741 A * | 7/1991 | Smith | A62B 3/00 116/205 |
| 5,051,034 A * | 9/1991 | Goodman | 405/157 |
| 5,102,012 A * | 4/1992 | Foster | 222/40 |
| 5,129,428 A | 7/1992 | Winter et al. | |
| 5,182,954 A * | 2/1993 | Menheere | 73/864.45 |
| 5,906,226 A * | 5/1999 | Goodman | 138/109 |
| 5,983,949 A * | 11/1999 | Pohle | F16L 11/124 138/104 |
| 6,092,558 A * | 7/2000 | Maccario | 138/178 |
| 6,421,905 B1 | 7/2002 | Feher | |
| 6,933,438 B1 * | 8/2005 | Watts et al. | 174/480 |
| 6,955,189 B1 * | 10/2005 | Weyker | 138/104 |
| 7,631,666 B1 * | 12/2009 | Ng et al. | 138/104 |
| 8,752,591 B2 * | 6/2014 | Montalvo et al. | 138/122 |
| 2001/0027310 A1 * | 10/2001 | Parisi et al. | 604/524 |
| 2006/0138770 A1 | 6/2006 | Miyajima et al. | |
| 2006/0174960 A1 * | 8/2006 | Evans | 138/137 |
| 2009/0301593 A1 | 12/2009 | Zucchi et al. | |
| 2010/0006171 A1 * | 1/2010 | Tomlin et al. | 138/104 |
| 2011/0247714 A1 * | 10/2011 | Kanao | 138/137 |

FOREIGN PATENT DOCUMENTS

| | | |
|---|---|---|
| DE | 4238696 A1 | 5/1994 |
| DE | 19503722 A1 | 8/1996 |
| DE | 20102973 U1 | 7/2001 |
| EP | 0969237 A2 | 1/2000 |
| EP | 2233812 A1 | 9/2010 |
| JP | 2008256013 A | 10/2008 |
| JP | 2009250273 A | 10/2009 |
| NL | 8900560 A | 10/1990 |
| SU | 1237862 A1 | 6/1986 |

OTHER PUBLICATIONS

Chapter II International Preliminary Report on Patentability of PCT/EP2012/073255 mailed Oct. 18, 2013.

* cited by examiner

GARDEN HOSE AND HOSE IRRIGATION SYSTEM COMPRISING SAID GARDEN HOSE

The invention relates to a garden hose and to a watering hose system comprising such a garden hose.

Garden hoses typically consist primarily of a flexible thermoplastic material, which is inexpensively available in the form of PVC (polyvinyl chloride), in particular, and which is suitable for the manufacture of hose by an extrusion process.

Conventional watering hose systems include hose accessories, in the form of tap connectors, hose couplings or watering equipment, for example, which are designed to be attached to one end of a hose, such a hose end being provided by a cut through the hose without any particular configuration of a hose end, so the hose can also be shortened to any desired length by the user.

In order to connect connectors to one end of a hose, conventionally designed connectors have an inner connecting pipe which is inserted into the inside of the hose end, and retaining elements which engage around the outer side of the hose and which can be pressed against the outer surface of the hose. The retaining elements, which are specifically designed as arms which can be pivoted transversely to the hose axis and which have retention structures facing towards the hose, are typically pressed against the outer surface of the hose by means of a sleeve nut having a conical section. The retention structures are embodied, for example, as ribs running circumferentially, which, when pressed against the hose surface, compress the latter with deformation of the elastic cover material of the hose.

It has been found that some users are unable to apply sufficient manual force when tightening the sleeve nut, or are unwilling to apply sufficient force for fear of damaging the connector, which can result in the axial retention force between the connector and the end of the hose being too weak, and the connector slipping off the end of the hose due to the water pressure in the hose, or when pulling the hose.

The object of the invention is to specify a garden hose and a watering hose system having such a garden hose, which provide improved grip of the hose when held in a user's hand and/or improved grip between one end of the hose and a connector, without requiring increased strength and while maintaining ease of operation and cost-efficient producibility.

Solutions according to the invention are described in the independent claims. The dependent claims contain advantageous embodiments and developments of the invention.

Forming a relief structure on the outer side of an cover layer of the hose is a prerequisite for connecting a hose connector to the end of the hose by interlocking or semi-interlocking engagement, so that a substantially stronger retaining force is produced between the end of the hose and the connector, in comparison with conventional garden hoses. Conventional connectors can be advantageously connected to such a garden hose, in that the shaping of the relief structure takes conventional retention structures into consideration. Alternatively or additionally, the relief structure may result in improved grip for a user's hand.

The relief structure provided is a design for the outer side of the outer jacket or cover layer, which has at least one radial elevation or indentation relative to an averaged radius of the outer side along the longitudinal axis of the hose. The relief structure preferably includes a plurality of successive elevations and/or indentations in the longitudinal direction. The relief structure preferably includes a ribbed structure comprising ribs extending circumferentially about the longitudinal axis, wherein webs between adjacent indentations in the longitudinal direction are are also to be understood as ribs.

In a first advantageous embodiment, the relief structure may be embodied directly in the outer surface of the hose, with the result that retention structures of a connector engage directly and interlockingly with the relief structure of the hose.

In one preferred embodiment, the relief structure is covered at least partially and preferably completely by a covering layer, such that the side of the covering layer facing away from the relief structure forms the hose surface or a portion thereof. In this way, the hose surface itself may be designed throughout without any indentations or elevations in comparison with a cylindrical shape of an outer jacket, thus preventing the accumulation of dirt in the relief structure and making it more pleasant for a user to handle the hose with a hand sliding along the surface of the hose, for example when rolling up the hose, than in the case of a hose surface which is interrupted by a relief structure. The covering layer consists advantageously of a softer material compared with the material of the relief structure, in other words with a lower Shore hardness. Due to the lower Shore hardness of the material of the covering layer, what primarily happens when pressing the retention structure of a connector against the hose surface is that the covering layer is deformed and the retention structure partially engages interlockingly with the relief structure, or the retention structure at least comes radially closer to the relief structure.

In one advantageous embodiment, the relief structure is limited to one part of the outer side of the cover layer, the surface of the relief structure occupying preferably less than 30%, in particular less than 20% of the total outside area of the cover layer.

In one advantageous embodiment, the relief structure comprises at least one structured strip extending in the longitudinal direction on the outer side of the cover layer. The strip may be subdivided in the longitudinal direction into spaced-apart strip sections, or be provided with the relief structure in strip sections only, such that longitudinal sections of the hose with and without a relief structure succeed each other alternatingly in the longitudinal direction.

In one preferred embodiment, a plurality of such strips are provided as substructures of the relief structure and distributed around the circumference of the hose, with at least three strips preferably being provided. The plurality of strips are preferably grouped in rotationally symmetric arrangement about the longitudinal axis of the hose, thus resulting advantageously in particularly uniform loads being imposed on the hose and the connector.

The relief structure can also be limited to a particular proportion of the outer surface of the cover layer by subdividing the area differently, more particularly in the form of annular areas around the circumference of the cover layer and spaced apart in the longitudinal direction, in the form of a diagonal lattice, or in the form of islands mutually spaced apart from each other in the circumferential direction and in the longitudinal direction in the outer side of the cover layer, as substructures of the relief structure.

Embodying the substructures in the form of strips is particularly advantageous for the production process, because the relief structure can be obtained with little complexity and expense by structuring the cover layer, which is extruded with a smooth outer surface, in a simple manner while it is still soft by means of a tool shortly after the extrusion nozzle, both as substructures extending continuously in the longitudinal direction and also as substructures subdivided into spaced-apart longitudinal sections.

A relief structure which is limited to a partial area of the cover layer may consist, in a preferred embodiment, of a material which differs from the material of the rest of the cover layer and more particularly which has a higher Shore hardness compared to the rest of the cover layer. In the advantageous strip shape of the relief structure or in the circumferential substructures, the material of the relief structure may form part of the cover layer and to that end be extruded simultaneously with the rest of the material of the cover layer in a particularly advantageous manner.

In another advantageous embodiment, a strip-shaped trench radially indented in relation to the outer surface of the cover layer is formed in said cover layer, in which trench a strip with the radially outwardly facing relief structure is laid. The strip with the relief structure typically consists in this case of a material having a higher Shore hardness than the material of the cover layer surrounding the strip. In a first advantageous embodiment, the strip with the relief structure may fill out the trench in the circumferential direction across the entire width of the trench, and the harder material of the strip with the relief structure may advantageously form, in close material connection to boundary surfaces on the rest of the cover layer, a boundary surface with close material connection and with mechanical resilience in the circumferential direction. In another advantageous embodiment of the invention, the strip with the relief structure does not fill the trench in the cover layer circumferentially across the entire width of the trench, with the result that narrow gaps remain circumferentially between the side walls of the strip with the relief structure and the side walls of the trench.

In the case of an embodiment with a strip-shaped trench in the outer cover layer and with a relief structure placed in the trench, such a combination of outer jacket structure with a strip-shaped trench and a strip carrying the relief structure can be manufactured in different ways. More specifically, a layer thereunder, in particular an interlayer with fabric reinforcement, extending as a closed outer circumferential cover layer around the longitudinal axis of the hose can be produced simultaneously in one extrusion step using two separate extrusion nozzles and with one extruder assigned to each of the extrusion nozzles. In another advantageous embodiment, the outer cover layer has a two-ply structure, and the hose is manufactured in such a way that a first sublayer of the outer cover layer is firstly produced circumferentially about the longitudinal axis with a constant layer thickness, and that a second sublayer, in which the strip with the relief structure in the circumferential direction forms a sub-section of said second sublayer. is produced on top of said first sublayer.

The relief structure preferably has a longitudinally periodic structure with successive elevations and indentations, wherein the period length of the periodic structure may be identical in a first preferred embodiment to the distance between successive elements of retention structures in a connector. This results in especially deep meshing engagement with a simultaneously high level of stability of the relief structure.

In another embodiment, the period length of the relief structure and of the retention structure of a connector may also differ, thus making it easier to use connectors made by different manufacturers on the same hose.

In one particularly advantageous embodiment characterised by a low tendency to accumulate dirt, the relief structure may have a longitudinally continuous corrugations from the lateral perspective, with a smaller amplitude relative to the wavelength.

In order to improve the haptic characteristics of the hose surface in a particularly advantageous manner, it is also conceivable to design the relief structure in the form of one or more strips projecting by a small amount beyond the hose surfaces that follow circumferentially.

Figure 2:
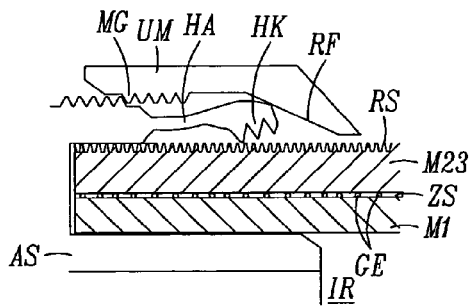
Figure 3:
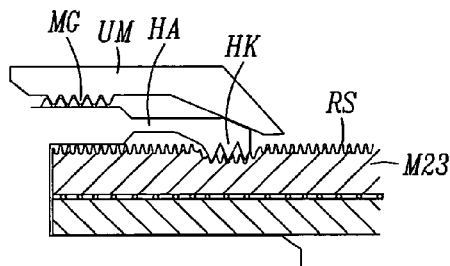
Figure 5:
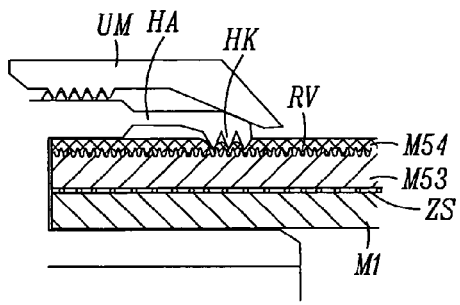
Figure 4:
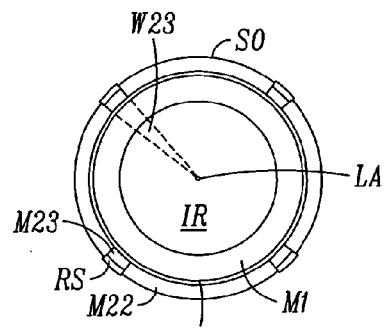
Figure 6:
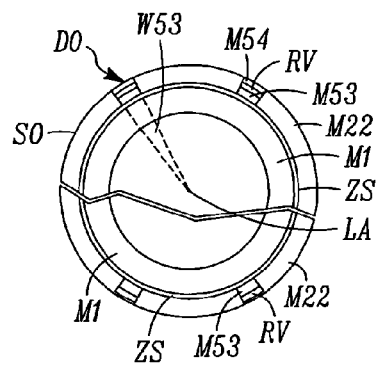
Figure 7:
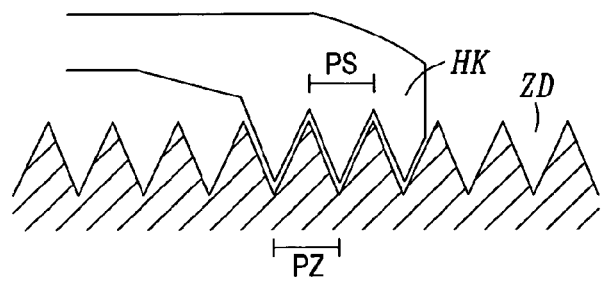
Figure 8:
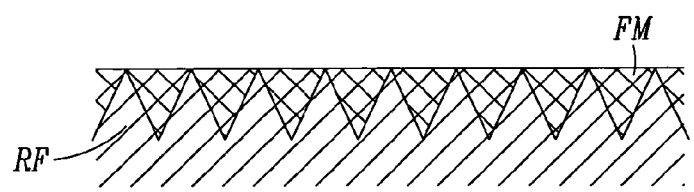
Figure 9:
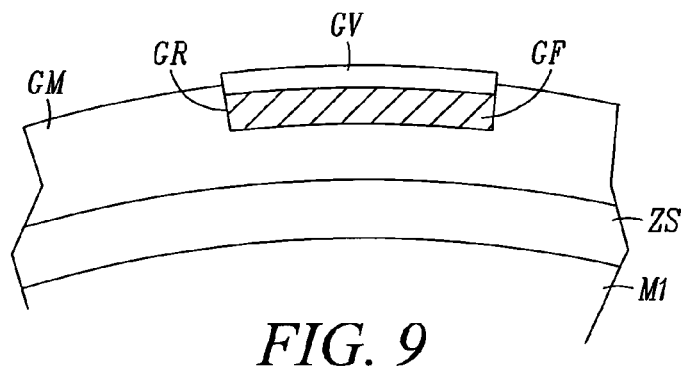
Figure 10:
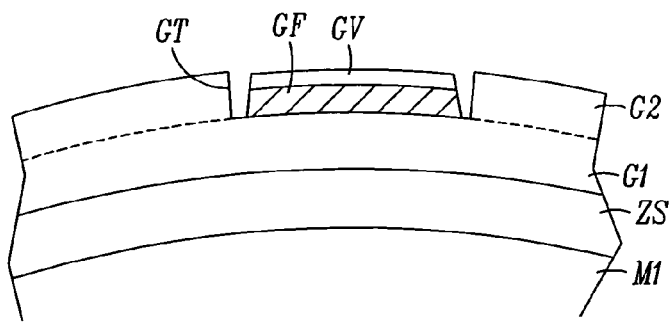
Figure 11:
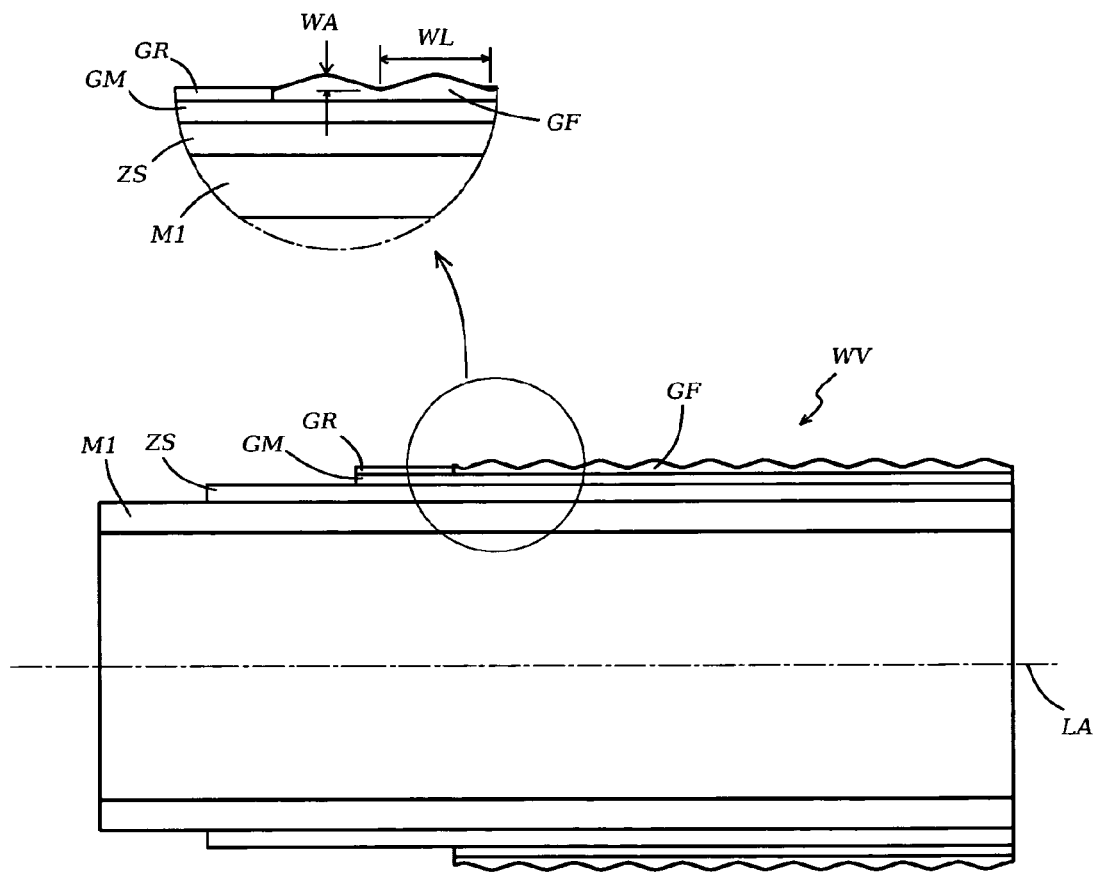

The invention shall now be described in greater detail with reference to preferred embodiments and to the Figures, in which FIG. 1 shows a connector at one end of a hose, FIG. 2 shows a cross-section through a connection region, FIG. 3 shows the view according to FIG. 2 with the connection tightened, FIG. 4 shows a cross-section through a hose FIG. 5 shows a view, analogous to FIG. 3, of an embodiment with a covered relief structure, FIG. 6 shows a cross-section through a hose in the embodiment shown in FIG. 5, FIG. 7 shows an embodiment in which the relief structure and the retention structure of a connector have the same period length, FIG. 8 shows an embodiment of a filled relief structure, FIG. 9 shows an embodiment with relief strips fitted into a trench structure, FIG. 10 shows an embodiment with a trench width that is enlarged relative to a relief strip, FIG. 11 shows a side view of a corrugated relief strip.

FIG. 1 shows an oblique view of one end of a garden hose GS having a connector retained thereon, for example a hose connector SK. The end of the hose and the hose connector are connected in a manner that is known per se, such that a main body of hose connector SK has a connecting pipe which is hidden in FIG. 1 by the end of the hose and which is inserted into the interior of the hose from the end of the hose. The hose is surrounded on the outside by a plurality of retaining element arms HA which have retaining claws HK that are an integral part of the main body of hose connector SK. Retaining claws HK can be moved radially by deformation of retaining arms HA between a released position, in which the end of the hose can be moved in the direction of the longitudinal axis LA of the hose relative to the hose connector, and a retaining position in which the retaining claws are pressed into the surface of the hose. A sleeve nut UM surrounds the hose and can be screwed onto the main body of hose connector SK by a thread connection MB. Sleeve nut UM has a slanted or curved contact surface located in the conventional manner on the radially inner side and facing axially away from the main body of the hose connector, and when sleeve nut UM is screwed onto the main body of the hose connector, said contact surface presses retaining claws HK against the hose surface and presses the retaining claws into the hose surface with elastic deformation thereof. Such connections are common and are known, for example, from the OGS system made by Gardena.

In the example shown in FIG. 1, garden hose GS is composed of several layers, with an inner cover layer surrounded by fabric GE and thus stabilised against expansion. Fabric GE is embedded in an interlayer ZS or is itself viewed as such an interlayer. The fabric is covered by a second cover layer, in the outward surface of which a relief structure according to the invention is formed.

The relief structure has elevations or/and indentations relative to a circular cylindrical surface around longitudinal axis LA of the hose, and such a circular cylindrical surface may be defined, in particular, by a smooth surface that is not structured by a relief, and which forms the predominant portion of the outward surface of the cover layer.

In the example shown in FIG. 1, a second material M22, which is assumed in the example to be transparent, forms the largest proportion of the outward surface of the second layer.

In the embodiment shown in FIG. 1, a relief structure RS provided in accordance with the invention is provided in strip S3 made of a third material M23, which interrupts the the second material M22 circumferentially and circumferentially forms individual sections of the second layer. Several of the strips S3 interrupting the second material M22 are preferably distributed around the circumference and are circumferentially offset from each other. In the example outlined, four strips S3 are provided.

Another strip, which is preferably embodied continuously in a longitudinal direction parallel to the longitudinal axis LA, and the width of which varies in the longitudinal direction, is referenced with reference sign S1 and consists of a first material M21. Strip S1 is used, for example, to receive a visually recognisable structure indicating a manufacturer or type of hose. Strip S1 may circumferentially interrupt the cover layer made of the second material, or be embedded in the latter, or be completely covered by the latter. In the example outlined, it is assumed that two strips S1 made of the first material M21 and of varying strip length in the longitudinal direction are arranged with a 180° offset from each other, and that two strips S3 made of the third material M23 are each arranged circumferentially between said strips made of the first material M21. The entire arrangement of strips preferably has axial symmetry in relation to the longitudinal axis LA. A relief structure RS is formed at least in longitudinal sections of the third strips S3, in the radially outwardly facing surface thereof relative to the longitudinal axis LA. The relief structure RS may also be continuously present throughout the entire length of strips S3.

FIG. 2 shows a schematic cross-section along the longitudinal axis LA of an arrangement according to FIG. 1. The layer thicknesses of the cover layers and the interlayer of the multi-layer hose structure are not to be seen as drawn to scale, and for illustration purposes are drawn in strongly exaggerated form in some respects compared to real relative layer thicknesses.

The inner cover layer M1 of the hose structure forms the inner wall of the hose around its inner space IR and contacts connecting pipe AS of the connector, thus sealing the connection between the hose and the connector. In FIG. 2, in the outer cover layer radially following the interlayer ZS with the fabric, a strip S3 made of the third material M23 of the outer cover layer is shown. Relief structure RS is formed by circumferentially extending ribs, which form successive elevations and indentations in the longitudinal direction relative to a circular cylindrical surface.

FIG. 4 shows a cross-section through the hose, in which such a circular cylindrical surface is predefined as a circular cylindrical surface SO, for example by the outer surface of the second material M22 surrounding strip S3. Relief structure RS forms indentations and elevations relative to said outer surface SO, as indicated by the two radially closely adjacent circumferential lines of the relief structure RS in FIG. 3. A relief structure in the third material M23 of strip S3 can be produced, for example, by a structured tool deforming the surface of the extruded material M23, at a small distance downstream from the extrusion nozzle of an extruder arrangement, to form a relief structure while the material is still soft, before the material transitions as a result of further cooling into a dimensionally stable but still elastically deformable state. Structuring a smoothly extruded surface is known per se to a person skilled in the art.

The angle occupied by a strip about longitudinal axis LA is marked with reference sign W23. Unlike in FIG. 1, no first strip S1 drawn into FIG. 4, and the four strips S3 are each spaced apart from each other by 90° about the longitudinal axis.

In FIG. 2, a retaining claw HK on a retaining arm HA is shown in the released position, in which the end of the hose can be pushed, parallel to the longitudinal axis of the hose, onto connecting pipe AS of the main body of the hose connector, or pulled off same. Thread connection MG between the main body of the hose connector and the sleeve nut is mainly untightened, and retaining claw HK rests against a radially large conical ramp surface of the sleeve nut.

When sleeve nut UM, proceeding from FIG. 2, is screwed onto the main body of the hose connector, and thread connection MG engages increasingly in thread engagement, retaining claw HK is pressed radially towards the hose surface by ramp surface RF sliding along it, and the tips of retaining claw HK, which extend as cutting edges circumferentially about the longitudinal axis LA of the hose, engage with the outer surface of the hose.

As shown in FIG. 3, the result is that, in the region of relief structure RS of strip S3, the retaining claws engage with the hose surface, partly by radially inwardly displacing the hose surface by elastic compression of material M23 or, due to preferably high hardness of the third material M23, in particular of the layers therebelow, but in particular by positive, interlocking engagement of the retaining claws with the relief structure RS of the outwardly facing surface of strips S3 made of the third material M23. Such interlocking engagement substantially increases the retention force of the connection between hose end and connector, so even users who can apply only moderate manual force when tightening the sleeve nut can connect the hose end to the connector in such a way that the hose is reliably prevented from slipping off the connector. At areas that are circumferentially outside strips S3, retaining claws HK of the plurality of retaining elements dig into the hose surface in the conventional manner, solely by elastic deformation of the hose surface, in particular of the second material M22.

FIG. 5 shows another advantageous embodiment in a view analogous that shown in FIG. 3. A relief structure RV, of the kind also shown in the example according to FIG. 2 and FIG. 3, is again formed on the outwardly facing side of a third material M53, which has the same or similar characteristics, for example, as the third material M23, and which in particular is harder than the surrounding materials. Material M54 has a substantially lower Shore hardness than material M53.

When the hose is embodied in such a way with the soft covering layer M54, the main result of retaining claws HK being moved from their released position due to sleeve nut UM being screwed onto the thread connection with the main body of the connector is that the soft cover material M4 is elastically deformed and that the cutting edges of retaining claw HK engage partially interlockingly or at least semi-interlockingly with the relief structure RV, which is covered by the covering layer made of soft covering material M54, and which is provided in the relatively harder material M53, on the outwardly facing surface of which the relief structure RV is formed. Partial engagement of retaining claws HK is limited by the material M53 which is present in the indentations of relief structure RV. Semi-interlocking engagement is considered to be any situation in which the tips of retaining claws HK are not yet inside the outer radius of the relief structure, for example because material M53 under retaining claw HK is likewise moved radially inwards by elastic deformation, but in which the radial distance of the tips of the retaining claws from the relief structure, compared to the initial thickness of the covering layer made of the soft material M54, is greatly reduced due to the softer covering material M54 being more easily deformed, thus resulting in a retention force similar to that resulting from interlocking engagement.

FIG. 6 shows, in a view analogous to FIG. 4, a cross-section through a hose in the embodiment outlined in FIG. 5, with two different advantageous variants being shown in the upper and the lower halves of the Figure.

In the variant shown in the upper half of FIG. 6, the relief structure is covered by a material M54 having a lower Shore hardness, also and in particular with a lower Shore hardness than the second material M22 that follows circumferentially on both sides. The covering material M54 which covers the relief structure forms a smooth surface DO over the strip-shaped material M53 with the relief structure, in particular as part of a circular cylindrical outer surface of the hose flush with the circular cylindrical outer surface of the cover layer made of the second material M22 and marked with reference sign SO in FIG. 4.

In the variant outlined in the bottom half of FIG. 5, a covered relief structure RV is formed on the outer side of a strip made of a relatively hard third material M53, which in this variant is covered by a thin covering layer forming the entire surface of the hose, although the material of the covering layer can also be the second material M22.

FIG. 7 shows an embodiment of a relief structure ZD, in which the successive elevations and indentations in the cross-sectional view have an at least approximately triangular shape. The angle of the triangular shape, and the period length PZ of the longitudinally periodic relief structure are essentially identical in this embodiment to the angles of the retaining claw and the periodic structure PS of the plurality of cutting edges of the retaining claw. This results in particularly deep engagement of the retention structure of the retaining claw in the relief structure of the hose, and in a particularly strong retention force and stability of the relief structure and of the interlocking engagement.

FIG. 8 shows an example in which a relief structure RF made of a material having a high Shore hardness is filled, to a level substantially flush with the radially outer ends of the relief structure, with a filler material FM having a substantially lower Shore hardness compared to the material of relief structure RF. Filling with filler material to a level flush with the radially outer ends of the relief structure is a borderline case between partial filling or closed covering as shown in the example in FIG. 5.

FIG. 9 shows a section of an outer jacket of a hose, in which an outer cover layer, as a circumferentially closed layer, completely covers interlayer ZS radially outside said interlayer. In the outward surface of this outer cover layer GM, a trench-shaped indentation GR is formed, which continues in the form of a strip perpendicularly to the plane of the drawing in FIG. 9 and which is completely filled by a material GF. Material GF is the material having a relief structure GV and preferably having a higher Shore hardness than the surrounding material of cover layer GM. Material GF and material GM are preferably dispensed simultaneously in a joint extrusion step from different sub-nozzles of an extrusion nozzle arrangement, such that the outer cover layer, including material GF with relief structure GV, is produced simultaneously.

FIG. 10 shows an embodiment in which an outer two-ply cover layer is formed radially after the interlayer, a first sublayer G1 being produced as a closed circumferential layer around the interlayer and having a substantially circular cylindrical outer surface, and a second sublayer G2 being subsequently deposited on said circular cylindrical outer surface in such a form that sublayer G2 is circumferentially interrupted at at least one and preferably more places so that one or more strip-shaped trenches GT are produced in the second sublayer. A material GF having a higher Shore hardness is produced in said strip-shaped trench or trenches, and by means of a material connection at the boundary layer to the first sublayer G1 is secured mechanically fixedly to said first sublayer G1. The material of the second sublayer G2 and the harder material GF of the strip having relief structure GV and disposed in trench GT are preferably produced simultaneously, again as described with reference to FIG. 9, from an extrusion nozzle arrangement having different sub-nozzles and extruders assigned to the different sub-nozzles.

Producing the outer cover layer from two sublayers G1 and G2 advantageously allows visual structures to be provided in the boundary surface indicated by a broken line, such as a reference to the manufacturer, for example, and/or to a hose type, and thus for printed information on the outer surface of the hose to be replaced by such an arrangement of a visual structure. A visual structure disposed in this manner in a trench is protected against abrasion in the long term by the second sublayer G2, in contrast to information printed onto the surface.

FIG. 11 shows a preferred embodiment with a hose structure as shown in FIG. 9, comprising a first cover layer M1, an interlayer ZS and a second, outer cover layer GM, but with an additional material GF being deposited in trench-shaped indentations GR which continue in the form of a strip, said additional material GF forming a relief structure WV on its radially outward side relative to the central hose axis LA. In this case, relief structure WV is approximately corrugated in shape and relief structure WV radially projects at least partially, preferably at least predominantly or completely, beyond the edge of trench-shaped indentation GR. This can bring about a haptic impression of the relief structure that is particularly beneficial for the user, and can also minimise the susceptibility of the relief structure dirtiness, in the form of dirt accumulating in corners. The relief structure is shown in even greater detail in an enlarged section. The relief structure advantageously extends in the longitudinal direction of the trench-shaped indentation, or of the strip of material GF deposited therein, as a rounded wave progressing in the longitudinal direction without peaks and corners, preferably approximating to a sinus function, but without being directly limited to such. The radial difference between the radially innermost and the radially outermost position of the wavy relief structure, referred to as amplitude WA, is preferably smaller than the period length of the periodically repeated structure, referred to as wavelength WL. Amplitude WA is preferably at most 40%, in particular at most 25% of wavelength WL. The minimum radius of curvature of the profile of relief structure WL in the form shown in FIG. 11 is advantageously no less than 50% of amplitude WA.

A relief structure GV can be produced by plastic deformation of the plastic material GF downstream from the extrusion nozzle, while it is still warm, again analogously to the description of how the other relief structures are produced, for which purpose it is advantageous to use a wheel having a complementary relief structure along its wheel circumference, which is rolled along the hose as the hose is progressively extruded. The different layer structures shown in the various embodiments may be combined in other ways also.

In deviation from the view according to FIG. 1, the plurality of strips with the relief structure are preferably distributed circumferentially in a uniform manner, with identical angular offsets from the adjacent strips. This advantageously minimises the load exerted on the hose by a tool producing the relief structure, and largely prevents any deformation of the hose. Preferably, as shown in FIG. 4 and FIG. 6, exactly four strips made of the harder material M23, M53 are provided with the relief structure.

In particular when covered by a covering layer made of a soft material, the relief structure can also be embodied such that it completely and continuously encircles the longitudinal axis LA of the hose on the outward surface of a cover layer, or it may be distributed in some arrangement other than the strip-shaped arrangement described as a preferred example. Instead of the preferred ribbed structure of the relief structure, other forms of relief structure can also be provided.

The features specified above and in the claims, and shown in the Figures, may be advantageously realised both singly and in various combinations. The invention is not limited to any of the embodiments described in the foregoing, but may be adapted in many different ways by the routine skill of those skilled in the art.

The invention claimed is:

1. A garden hose comprising:
a cover layer defining an external surface extending substantially along a longitudinal length of the garden hose, the cover layer facing radially outwards in relation to a longitudinal axis of the garden hose;
a trench formed in the external surface of the cover layer, the trench extending in a direction substantially parallel to the longitudinal axis of the garden hose along the longitudinal length of the garden hose; and
a strip formed of a material different than material forming the cover layer, the strip being disposed in the trench such that the strip extends in the direction substantially parallel to the longitudinal axis of the garden hose along the longitudinal length of the garden hose,
wherein a relief structure is formed in the strip, the relief structure being defined by a plurality of circumferentially extending ribs periodically repeating along an entire length of the strip, and wherein the relief structure is shaped to receive approximately complementarily retaining elements of a connector.

2. The garden hose of claim 1, wherein the ribs comprise a plurality of radial indentations or elevations relative to an averaged radius of an outer side of the cover layer, the radial indentations or elevations extending longitudinally in a direction substantially perpendicular to the longitudinal axis of the garden hose.

3. The garden hose of claim 1, wherein the strip fills an entire width of the trench between side walls of the trench.

4. The garden hose of claim 1, wherein the strip does not fill an entire width of the trench leaving a gap between respective sidewalls of the strip and sidewalls of the trench.

5. The garden hose of claim 1, wherein the relief structure is recessed relative to the external surface.

6. The garden hose of claim 1, wherein the relief structure occupies less than 30% of the cover layer.

7. The garden hose of claim 1, wherein the relief structure is covered by a covering material, the covering material having a lower Shore hardness than material of the relief structure and being transparent.

8. The garden hose of claim 1, wherein material of the relief structure has a higher Shore hardness than surrounding material of the cover layer.

9. The garden hose of claim 1, further comprising a plurality of trenches, each of the trenches including a corresponding strip, wherein the trenches are circumferentially spaced apart from each other about the cover layer arranged in periodic succession.

10. The garden hose of claim 1, wherein the relief structure comprises a plurality of rounded wave structures forming the ribs, the rounded wave structures progressing along the longitudinal length of the garden hose approximating a sine function.

11. The garden hose of claim 1, wherein the relief structure comprises a plurality of pointed structures forming the ribs with a substantially triangular shape.

12. A watering hose system comprising:
a garden hose; and
a connector configured to be disposed at one end of the garden hose,
wherein the garden hose comprises:
a cover layer defining an external surface extending substantially along a longitudinal length of the garden hose, the cover layer facing radially outwards in relation to a longitudinal axis of the garden hose;
a trench formed in the cover layer, the trench extending along the external surface of the cover layer in a direction substantially parallel to the longitudinal axis of the garden hose along the longitudinal length of the garden hose; and
a strip formed of a material different than material forming the cover layer, the strip being disposed in the trench such that the strip extends in the direction substantially parallel to the longitudinal axis of the garden hose along the longitudinal length of the garden hose,
wherein a relief structure is formed in the strip, the relief structure being defined by a plurality of circumferentially extending ribs periodically repeating along an entire length of the strip, and
wherein the connector comprises a connecting pipe that is insertable into an interior of the garden hose, and retaining elements configured to be pressed against the external surface of the garden hose, the retaining elements and the relief structure of the garden hose being shaped approximately complementarily to each other.

13. The watering hose system of claim 12, wherein the ribs comprises a plurality of radial indentations or elevations relative to an averaged radius of an outer side of the cover layer, the radial indentations or elevations extending longitudinally in a direction substantially perpendicular to the longitudinal axis of the garden hose.

14. The watering hose system of claim 12, wherein the relief structure is recessed relative to the external surface.

15. The watering hose system of claim 12, wherein the relief structure is covered by a covering material, the covering material having a lower Shore hardness than material of the relief structure.

16. The watering hose system of claim 12, wherein material of the relief structure has a higher Shore hardness than surrounding material of the cover layer.

17. The watering hose system of claim 12, further comprising a plurality of trenches, each of the trenches including a corresponding strip, wherein the trenches are circumferentially spaced apart from each other about the cover layer.

18. The watering hose system of claim 17, wherein the trenches are arranged in periodic succession.

19. The watering hose system of claim 12, wherein the relief structure comprises a plurality of rounded wave structures forming the ribs, the rounded wave structures progressing along the longitudinal length of the garden hose approximating a sine function.

20. The watering hose system of claim 12, wherein the relief structure comprises a plurality of pointed structures forming the ribs with a substantially triangular shape.

* * * * *